United States Patent

Steiner et al.

[15] 3,649,066
[45] Mar. 14, 1972

[54] SPRING ARRANGEMENT FOR FIXED AND TILTABLE DRIVER CABS

[72] Inventors: Adolf Steiner, Gerlingen; Hans Rinnergschwentner, Rotenfels, both of Germany

[73] Assignee: Daimler-Benz Aktiengesellschaft, Stuttgart-Unterturkheim, Germany

[22] Filed: Feb. 6, 1970

[21] Appl. No.: 9,178

[30] Foreign Application Priority Data

Feb. 8, 1969  Germany ..................... P 19 06 337.7

[52] U.S. Cl. .......................... 296/35 R, 92/129, 180/89, 254/93 R
[51] Int. Cl. .......................................... B62d 33/06
[58] Field of Search ................. 296/28 C, 35 R; 180/89; 49/344; 92/129, DIG. 4; 254/93, 124

[56] References Cited

UNITED STATES PATENTS

| 3,393,005 | 7/1968 | Herrmann et al. | 296/28 C |
| 2,947,376 | 8/1960 | Norrie | 180/89 |
| 2,793,767 | 5/1957 | Smith et al. | 254/124 UX |
| 2,210,519 | 8/1940 | Wollensak | 180/89 |
| 3,039,557 | 6/1962 | Boyce et al. | 180/89 |
| 3,157,240 | 11/1964 | Chew | 180/89 X |
| 3,174,575 | 3/1965 | May et al. | 180/89 X |
| 1,912,451 | 6/1933 | Hibbard | 296/35 R UX |

FOREIGN PATENTS OR APPLICATIONS

| 1,005,159 | 9/1965 | Great Britain | 180/89 |
| 62,670 | 2/1955 | France | 296/35 R |
| 1,089,284 | 6/1959 | Germany | 296/35 R |

*Primary Examiner*—Benjamin Hersh
*Assistant Examiner*—Leslie J. Paperner
*Attorney*—Craig, Antonelli and Hill

[57] ABSTRACT

A spring system for fixed and tiltable driver cabs in which springs preferably extending in the vehicle longitudinal direction are provided between the front edge of the driver cab and the vehicle frame while a mounting support of the driver cab equalizing any twisting of the vehicle frame is provided at or near the rear edge of the driver cab. The springs may be constructed as hair-pin-shaped, flat springs whose upper leg portion is connected with the driver cab.

9 Claims, 3 Drawing Figures

Patented March 14, 1972

INVENTORS
ADOLF STEINER
HANS RINNERGSCHWENTNER

BY Craig, Antonelli,
Stewart & Hill

ATTORNEYS

SPRING ARRANGEMENT FOR FIXED AND TILTABLE DRIVER CABS

The present invention relates to a spring system for fixed as also for tiltable driver cabs, especially those with comfort equipment.

Driver cabs are generally so connected with the vehicle frame that they include a relatively rigid support in proximity to the steering and a soft spring support in proximity to the rear edge of the driver cab, which entails the disadvantage that the spring effect cannot become effectively fully because the driver, for the most part, is seated closer to the forward than to the rear support or mount.

It is the aim of the present invention to eliminate the indicated disadvantage and to create a driver-cab spring means that contributes significantly to the increase of the driving comfort.

As solution to the underlying problems, a spring system for fixed and tiltable driver cabs, especially for driver cabs with comfort equipment is proposed, in which according to the present invention, starting approximately from the forward edge of the driver cab, springs extending preferably in the vehicle longitudinal direction are arranged between the driver cab and the vehicle frame, whereby a support or mounting of the driver cab is provided at the rear edge of the driver cab equalizing a warping or twisting of the vehicle frame.

In one preferred embodiment of the present invention, the two springs are constructed as approximately hair-pin-shaped flat springs with two leg portions connected with each other by way of an arc opposite the driving direction, whose upper leg portions are each connected securely with the driver cab.

According to a further feature of the present invention, the lower leg portion of each flat spring is rolled together into an eye and is held by a bolt connected securely with the vehicle frame by way of a bracket or plate, which bolt serves simultaneously as lower pivotal connecting place of a shock absorber, whose upper end is elastically suspended at the driver cab.

With a tiltable driver cab in which the point of action of the element causing the tilting movement is disposed between the axis of rotation and the center of gravity of the driver cab, a deformation of the flat spring is precluded during the tilting if the upper leg portion of the flat spring projects beyond its fastening place at the driver cab and is bent over at its end into a half-circle open in the upward direction which in the relieved condition of the flat spring abuts against the eye carried by the bolt.

A good lateral guidance of the driver cab is achieved if the width of the flat spring amounts to a multiple of its thickness.

For the purpose of tilting of the driver cab at least one cylinder adapted to be actuated by an auxiliary force is provided which, on the one hand, is supported at the vehicle frame and, on the other, is received and held at the driver cab by means of an elongated aperture. As a result of this arrangement of the cylinder, in case of a non-tilted driver cab an impairment of its spring movement is prevented.

Accordingly, it is an object of the present invention to provide a spring support for fixed and tiltable driver cabs or compartments which avoids by simple means the aforementioned shortcomings and drawbacks encountered in the prior art.

Another object of the present invention resides in a spring system for fixed and tiltable driver cabs of motor vehicles which permits the spring effect to become fully effective while at the same time considerably increasing the comfort of the driver.

A further object of the present invention resides in a spring system for the driver cab of a motor vehicle in which a deformation of the springs is far-reachingly precluded while, at the same time, the lateral guidance of the driver cab is considerably improved.

These and further objects, features and advantages of the present invention will become more obvious from the following description when taken in connection with the accompanying drawing which shows, for purposes of illustration only, two embodiments in accordance with the present invention, and wherein:

FIG. 1 is a somewhat schematic, greatly simplified cross-sectional view through a driver cab with a spring system in accordance with the present invention in which only the lower leg portion is rolled in;

Figure 1:
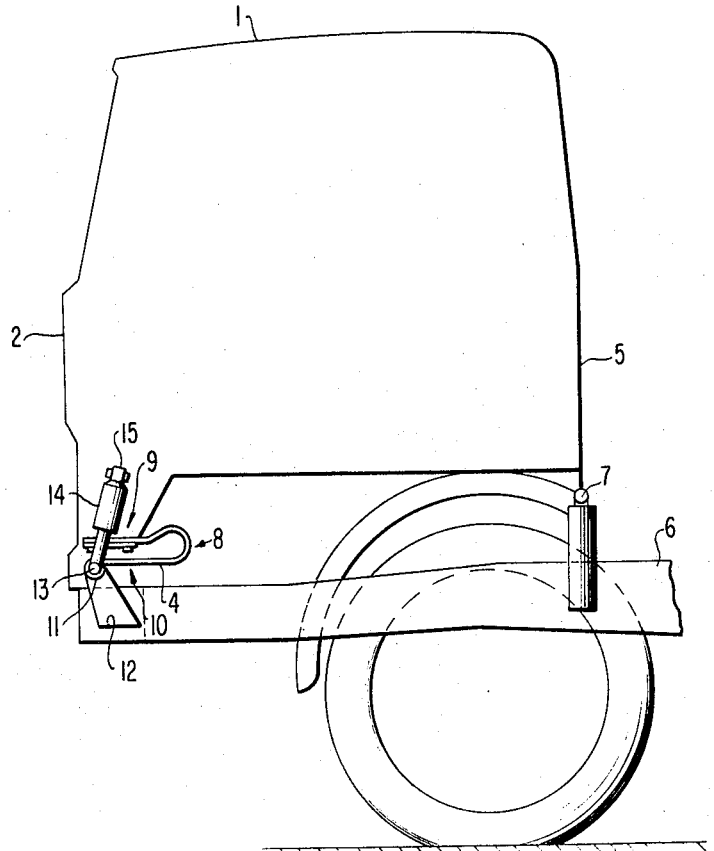

Referring now to the drawing wherein like reference numerals are used throughout the various views, and more particularly to FIG. 1, the driver cab 1 indicated schematically in this figure is spring-supported in proximity to its forward edge 2 by two springs extending in the vehicle longitudinal direction which are constructed as flat springs 4 of approximately hair-pin-shaped configuration. A conventional support 7 of any known construction equalizing any twisting or warping of the vehicle frame 6 is provided at the rear edge 5. Since such supports or mounts 7 are known in the art, a detailed description and showing thereof is dispensed with herein. The two flat springs 4 consist each of an arcuate portion generally designated by reference numeral 8 disposed opposite the driving direction which is adjoined by two leg portions generally designated by reference numerals 9 and 10. The upper leg portion 9 is fixedly connected with the driver cab 1 whereas the end of the lower leg portion is rolled together into an eye 11 and is carried by a bolt 13 connected fixedly with the vehicle frame 6 by way of a plate-shaped bracket 12. The bolt 13 serves as lower pivotal connecting place for a shock absorber 14 whose upper end 15 is elastically connected with the driver cab 1.

As a result of the arrangement of the flat springs 4 in proximity to the vehicle seats, the spring effect becomes fully operable for the passengers whereby the shock absorbers 14 effect a stroke limitation of the flat springs 4. During curve drives, a high degree of lateral guidance of the driver cab 1 is achieved in that the width of the flat springs 4 amounts to a multiple of their thickness. The described arrangement may also be utilized in a simple manner for tiltable driver cabs whereby the connecting line of the two bolts 13 represents the pivot axis. As a result of the appropriate pivotal connection of the shock absorber 14 the latter does not carry out any stroke movement during the tilting operation.

Figure 2:
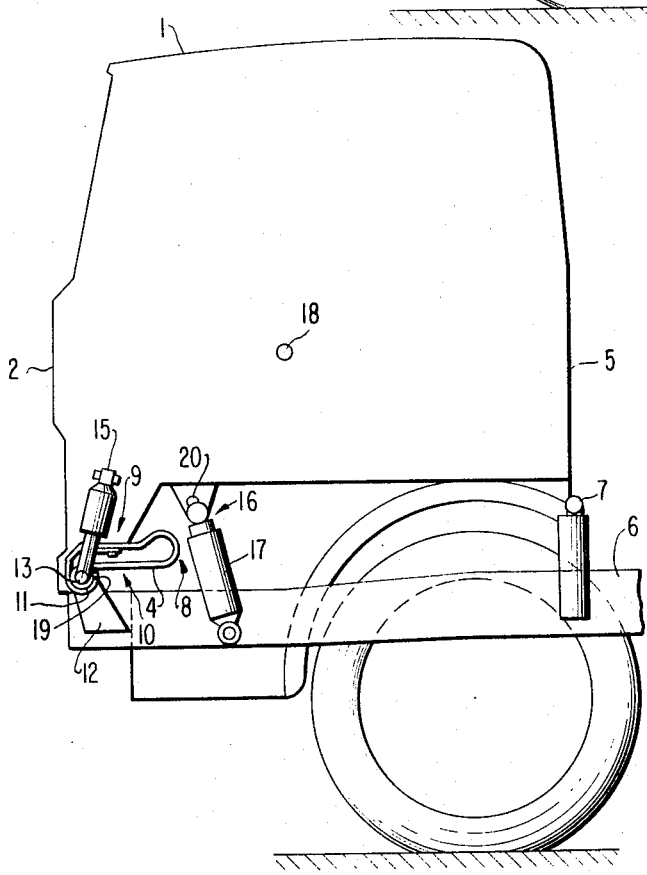
FIG. 2 is a schematic, greatly simplified cross-sectional view through a driver cab corresponding to FIG. 1, in which, however, the upper leg portion of the spring is bent into a semi-circle open in the upward direction.
Figure 3:
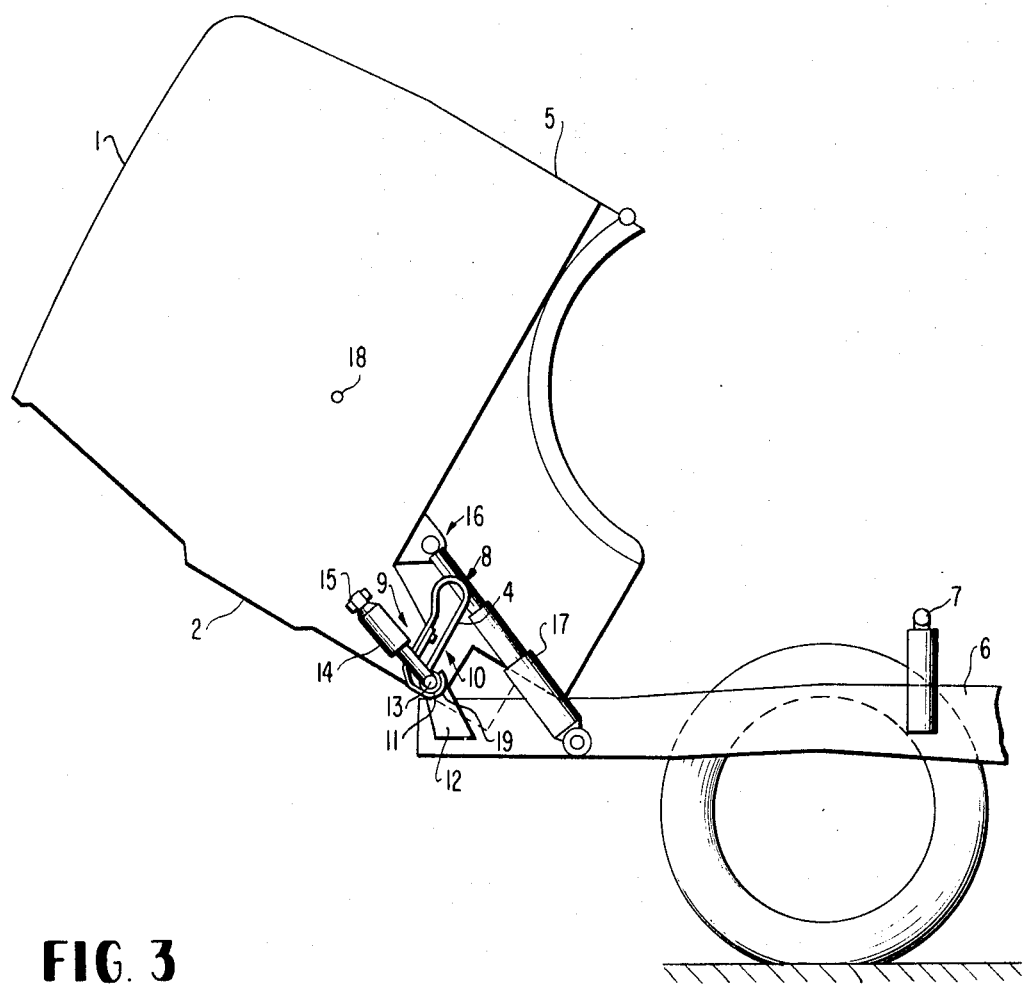
FIG. 3 is a schematic, cross-sectional view of the arrangement according to FIG. 2 in the tilted condition thereof.

If, with a tiltable driver cab, as illustrated in FIGS. 2 and 3, the point of engagement 16 of the cylinder 17 causing the tilting movement is located between the pivot axis formed by the two bolts 13 and the center of gravity 18, then the upper leg portion 9 which extends beyond its fastening place at the driver cab 1 is bent into a semi-circle 19 open in the upward direction. The semi-circle 19 abuts in the relieved condition of the flat springs 4 against a respective eye 11 carried by the corresponding bolt 13. If a downward spring deflection of the flat springs 4 takes place, then the leg portion 9 bent into the semi-circle 19 lifts off without impairing the spring effect. Furthermore, the cylinder 17 is guided at its pivotal connecting place with the driver cab 1 in an elongated aperture 20 in order also not to cause any impairment of the spring effect from this side. During the tilting operation which occurs after the abutment of the upper pivotal connecting place of the cylinder 17 against the upper rounded-off portion of the elongated aperture 20, both the eye 11 as also the semi-circle 19 of the leg portion 9 abutting thereagainst pivot about the bolt 13 and thus prevent an enlargement and therewith a permanent deformation of the leaf spring 4 connected therewith.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A spring arrangement for connecting fixed and tiltable driver cabs to a vehicle frame comprising spring means arranged between the driver cab and the vehicle frame, said spring means extending substantially in the longitudinal direction of the vehicle from a position adjacent the forward edge of the driver cab, said spring means including at least one approximately hair-pin-shaped flat spring with upper and lower leg portions connected together by an arcuate portion, said arcuate portion being open in the forward direction, said upper leg portion being fixedly connected to the driver cab, said lower leg portion being rolled together to form an eye, a bolt connecting said lower portion to the vehicle frame by way of bracket means, shock absorber means having an upper end elastically connected to said driver cab and a lower end connected to said bolt, and mounting means provided between the driver cab and the frame in the area adjacent the rear edge of the driver cab for equalizing twisting motion of the frame.

2. A spring arrangement according to claim 1, characterized in that the upper leg portion of each flat spring projects beyond its fastening place at the driver cab and is bent over at its end into an approximate semi-circle open in the upward direction which abuts in the relieved condition of the flat spring against the eye formed by the lower leg portion.

3. A spring arrangement according to claim 2, characterized in that the width of the flat spring amounts to a multiple of its thickness.

4. A spring arrangement according to claim 3, characterized in that at least one cylinder means adapted to be acted upon by an auxiliary force is provided for the tilting of the driver cab, and in that said cylinder means is connected at one end to the vehicle frame and is connected at the other end with the driver cab by way of an elongated aperture.

5. A spring arrangement according to claim 4, wherein said driver cab is a driver cab with comfort equipment.

6. A spring arrangement for connecting fixed and tiltable driver cabs to a vehicle frame comprising spring means arranged between the driver cab and the vehicle frame, said spring means extending substantially in the longitudinal direction of the vehicle from a position adjacent the forward edge of the driver cab, said spring means including at least one approximately hair-pin-shaped flat spring with upper and lower leg portions connected together by an arcuate portion, said arcuate portion being open in the forward direction, the end section of said upper leg portion disposed opposite the arcuate portion being fixedly connected to the driver cab, said lower leg portion being connected to the vehicle frame, and mounting means provided between the driver cab and the frame in the area adjacent the rear edge of the driver cab for equalizing twisting motion of the frame.

7. A spring arrangement according to claim 6, characterized in that the width of the flat spring amounts to a multiple of its thickness.

8. A spring arrangement according to claim 6, further comprising said lower leg portion being rolled together to form an eye, a bolt connecting said lower leg portion to the vehicle frame by way of bracket means, and shock absorber means having an upper end elastically connected to said driver cab and a lower end connected to said bolt.

9. A spring arrangement according to claim 8, characterized in that the upper leg portion of each flat spring projects beyond its fastening place at the driver cab and is bent over at its end into an approximate semi-circle open in the upward direction which abuts in the relieved condition of the flat spring against the eye formed by the lower leg portion.

* * * * *